UNITED STATES PATENT OFFICE.

GEORGE HENRY CLEGG, OF CARDIFF, WALES.

TREATING TIN-SCRUFF PRODUCED IN THE PROCESS OF MAKING TIN AND TERNE PLATES.

1,365,456.     Specification of Letters Patent.     Patented Jan. 11, 1921.

No Drawing.     Application filed June 14, 1920. Serial No. 388,911.

*To all whom it may concern:*

Be it known that I, GEORGE HENRY CLEGG, of 10 Oakfield street, Cardiff, in the county of Glamorgan, Wales, a subject of the King of Great Britain and Ireland, have invented certain new and useful Improvements in Treating Tin-Scruff Produced in the Processes of Making Tin and Terne Plates, of which the following is a specification.

This invention which relates to treating tin scruff as skimmed off from the plate-tinning pot or bath, consists in a process for recovering from the scruff valuable constituents thereof or therein contained or carried, as hereinafter set forth.

The process in which this invention consists is as follows:—

The tin scruff, as taken from the tinning pot or bath, is reduced by crushing to pebble character as, for example, to pieces of about one quarter of an inch in diameter. The crushed material is charged into a tank containing cold water the temperature of which is of any degree downward from approximately 60 degrees Fahrenheit. Approximate proportions are five parts of scruff to one part of water. The contents of the tank are then stirred or agitated. Chlorid of zinc contained in the scruff is thus dissolved. When the liquid has attained a specific gravity of about 1.3, it is pumped out or otherwise drawn off, carrying with it a proportion of the lighter particles of the solids, the residue of "sludge" remaining in the tank. The tank may be fitted with a screen or sieve for facilitating separation. The drawn-off liquid is next filtered in a filter press, vacuum filter or drainer, thus separating the liquid from the contained sludge and so recovering the chlorid of zinc. This valuable element is, except for a very small proportion, accordingly eliminated from the scruff, and evolution therefrom of hydrochloric acid fumes in further dealing with the scruff, is reduced to a practically negligible minimum and may, in some cases, be wholly obviated.

The sludge left in the tank after the liquid has been removed, as above set forth, contains palmitin and palmitic acid, tin, tin oxid and a small proportion of chlorid of zinc. This sludge is ground in a mortar mill or other suitable agitating device, cold water being added. When a pasty consistency is attained, the mixture is screened and thereby the heavier particles of tin are separated, and so recovered for re-use, from the lighter particles. Metallic oil soap is also separated in the screening operation last referred to. This metallic oil soap, which is also known as "tin soap," consists of tin oxid and palmitic acid. The metallic oil soap, containing a proportion of the lighter particles of tin above-mentioned, is charged into a vessel and agitated therein. In this operation the tin sinks down in the vessel, leaving the palmitin and palmitic acid and tin oxid supernatant. Thereafter, the palmitin and palmitic acid and tin oxid is filtered to extract water thereout. The palmitin and palmitic acid and tin oxid is next run into a tank of stone or slate, and a proportion of hydrochloric acid, sufficient to dissolve such tin oxy-chlorid and zinc oxy-chlorid as the palmitin and palmitic acid may contain, is added. These oxy-chlorids are, by the action of the acid, converted into chlorids. The liquid is next filtered and the palmitin and palmitic acid and tin oxid which it still contains is thus separated from the chlorids, the aqueous solution which goes through the filter carrying the chlorids with it.

The palmitin and palmitic acid and tin oxid, after this treatment, is then dried and is thereafter subjected to distillation which rids it of any dissolved tin not previously removed. In the process of distillation the tin oxid is the residue left in the still, the distillate containing a mixture of palmitin and oil.

What I claim and desire to secure by Letters Patent is:—

1. The process of recovering chlorid of zinc from the scruff formed in the tinning pots in the manufacture of tin and terne plates, which consists in crushing the scruff, subjecting the same to the action of cold water while agitating it, and separating the lighter particles of sludge from the chlorid of zinc in the liquid.

2. In the process of treating scruff as claimed in claim 1, the method of recovering from the residue, the tin and metallic oil soap, which consists in grinding said residue with cold water until the mass assumes a pasty consistency, and subsequently screening therefrom the heavier particles of tin and simultaneously separating out the metallic oil soap consisting of tin oxid, palmitin and palmitic acid.

3. In the process of treating scruff as claimed in claim 2, separating the palmitin, palmitic acid and tin oxid from the metallic tin by first stirring the metallic oil soap and thereafter drawing off the supernatant palmitin, palmitic acid and tin oxid and filtering the water therefrom, and subsequently adding to the recovered palmitin, palmitic acid and tin oxid a quantity of hydrochloric acid sufficient to dissolve such tin oxy-chlorid and zinc oxy-chlorid as the palmitin and palmitic acid may contain, and finally filtering, drying and distilling the palmitin and palmitic acid.

In testimony whereof I have signed my name to this specification.

GEORGE HENRY CLEGG.